United States Patent [19]

Higgins et al.

[11] Patent Number: 5,527,624
[45] Date of Patent: *Jun. 18, 1996

[54] PROCESS FOR PREPARING SINTERED SHAPES AND COMPOSITIONS USED THEREIN

[75] Inventors: William Higgins, Tucson, Ariz.; Fred E. Heller, Uniontown, Ohio; Reed H. Walsh, Mentor, Ohio; Ralph E. Kornbrekke, Chagrin Falls, Ohio; Stephen A. DiBiase, Euclid, Ohio

[73] Assignee: The Lubrizol Corporation, Wickliffe, Ohio

[*] Notice: The term of this patent shall not extend beyond the expiration date of Pat. No. 5,268,233.

[21] Appl. No.: 417,500

[22] Filed: Apr. 5, 1995

Related U.S. Application Data

[63] Continuation of Ser. No. 796,495, Nov. 22, 1991, abandoned.
[51] Int. Cl.$^6$ ........................................................ B32B 27/32
[52] U.S. Cl. ...................... 428/523; 428/411.1; 252/33.4; 264/44; 264/63; 264/65; 264/66; 501/1; 419/19; 419/30; 419/31; 419/36; 419/37
[58] Field of Search .................................. 428/411.1, 523; 252/33.4; 264/44, 63, 65, 66; 501/1; 419/19, 30, 31, 36, 37

[56] References Cited

U.S. PATENT DOCUMENTS

| | | | |
|---|---|---|---|
| 4,448,609 | 5/1984 | Tear et al. | 106/308 |
| 4,981,602 | 1/1991 | Ripple et al. | 252/33.4 |
| 5,268,233 | 12/1993 | Heller et al. | 428/523 |

OTHER PUBLICATIONS

Dispersion of Ceramic Particles in Organic Liquids, Mat. Res. Soc. Symp. Proc. vol. 73 (1986) Materials Research Society.

Dispersions of Ceramic Powders in Organic Media, Advances in Ceramics, vol. 21: Ceramic Powder Science Copyright 1987, The American Ceramic Society, Inc., pp. 411–415.

Dispersants in Ceramics Processing, British Ceramics Proceedings Published by British Ceramics Society vol. 37 (1986) pp. 249–253.

Tape Casting: The Basic Process for Meeting the Needs of the Electronics Industry, Ceramic Bulletin vol. 69 No. 6, 1990, pp. 1022–1026, by R. Mistler.

*Primary Examiner*—Nathan M. Nutter
*Assistant Examiner*—Duc Truong
*Attorney, Agent, or Firm*—William J. Connors; Frederick D. Hunter; John H. Engelmann

[57] ABSTRACT

The invention relates to a process for preparing sintered shapes, comprising the steps of:

(1) forming a green body from a mixture comprising a major amount of at least one inorganic powder; and one or more additives selected from the group consisting of: (A) at least one reaction product of a hydroxy compound with a carboxylic acylating agent; (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) at least one carboxylic acylating agent; (H) at least one aromatic acid or derivative thereof; (I) at least one aromatic oxime; and (J) at least one overbased or gelled overbased metal salt of an acidic organic compound provided that when the carboxylic acylating agent is a hydrocarbyl-substituted carboxylic acylating agent and the hydrocarbyl group contains less than an average of 40 carbon atoms, then the carboxylic acylating agent is a polycarboxylic acylating agent; and (2) sintering the body. Sintered shapes made from the compositions of the present invention have relatively high fired densities and grain sizes; and relatively low pore volume.

30 Claims, No Drawings

PROCESS FOR PREPARING SINTERED SHAPES AND COMPOSITIONS USED THEREIN

This application is a continuation of patent application Ser. No. 07/796,495, now abandoned.

TECHNICAL FIELD

This invention relates to methods for preparing sintered articles.

INTRODUCTION TO THE INVENTION

Methods for the manufacturing of sintered shapes frequently involve the use of additives for controlling the powder/slurry dispersion, rheology, green compaction, density, strength and grain size of the final shape. The objective generally is to achieve the highest possible density with a uniform, small grain size and in the area of electronic substrates, to achieve an ultra-smooth surface.

Many processes for preparing green bodys involve the preparation and use of slurries prepared by dispersing inorganic powders in liquids including, depending upon the application, water or organic liquids such as xylene, toluene, etc. The slurries of inorganic powders usually are prepared by milling a mixture containing the inorganic powder and the liquid. To improve the dispersion of the solids and maximize the solids concentration in the slurry and minimize slurry viscosity, additives have been added to obtain a complete dispersion of the powders in the liquid.

SUMMARY OF THE INVENTION

The invention relates to a process for preparing sintered shapes, comprising the steps of:

(1) forming a green body from a mixture comprising a major amount of at least one inorganic powder; and one or more additives selected from the group consisting of: (A) at least one reaction product of a hydroxy compound with a carboxylic acylating agent; (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) at least one carboxylic acylating agent; (H) at least one aromatic acid or derivative thereof; (I) at least one aromatic oxime; and (J) at least one overbased or gelled overbased metal salt of an acidic organic compound provided that when the carboxylic acylating agent is a hydrocarbyl-substituted carboxylic acylating agent and the hydrocarbyl group contains less than an average of 40 carbon atoms, then the carboxylic acylating agent is (i) a polycarboxylic acylating agent or (ii) a mixture of the hydrocarbyl-substituted acylating agent with a polycarboxylic acylating agent or a hydrocarbyl-substituted carboxylic acylating agent having a hydrocarbyl group with more than an average of 40 carbon atoms; and (2) sintering the body.

Sintered shapes made from the compositions of the present invention have relatively high fired densities, small uniform grain sizes, and low porosity. The additives of the present invention help disperse the inorganic powder. These additives improve deagglomeration of the inorganic powder and help prevent reagglomeration of the powder. The additives also act as dispersants, binders and lubricants in ceramics processing.

DESCRIPTION OF THE PREFERRED EMBODIMENTS

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

Unless otherwise indicated, molecular weight is determined by gel permeation chromatography and carbon number is determined by number average molecular weight.

Inorganic Powders

Inorganic powders used from the present invention include metallic and non-metallic powders. Powders may also be oxides or non-oxides of metallic or non-metallic elements. An example of metallic elements which may be present in the inorganic powders include calcium, magnesium, barium, scandium, titanium, vanadium, chromium, manganese, iron, cobalt, nickel, copper, zinc, yttrium, niobium, molybdenum, ruthenium, rhodium, silver, cadmium, lanthanum, actinium, gold or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 39. Ferromagnetic metals, for purposes of this invention, include iron, nickel, cobalt and numerous alloys containing one or more of these metals. In another embodiment, the metals are present as alloys of two or more of the aforementioned elements. In particular, prealloyed powders such as low alloy steel, bronze, brass and stainless steel as well as nickel-cobalt based super alloys may be used as inorganic powders.

The inorganic powders may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-identified metals, compounds such as beryllium oxide, magnesium oxide, calcium oxide, strontium oxide, barium oxide, lanthanum oxide, gallium oxide, indium oxide, selenium oxide, etc. Specific examples of oxides containing more than one metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$, $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$ and $LAB_6$. The inorganic powders (A) may also be a clay. Examples of clays include kaolinite, nacrite, dickite, montmorillonite, montronite, spaponite, kectorite, etc. In one embodiment, the inorganic powder is silicon nitride, silicon carbide, zirconia, alumina, aluminum nitride, barium ferrite, barium-strontium ferrite or copper oxide. In another embodiment, the inorganic powder is alumina or clay.

(B) Reaction Products of Hydroxy Compounds wish Carboxylic Acylating Agents.

The methods of the present invention use, in addition to the above-described inorganic powder, at least one additive. The additives or mixtures thereof are included in the methods of the present invention to assist in preparing sintered shapes. The presence of the additives facilitates the processing of the powders and provides for increased solids loadings. Green bodies made by the present inventor have improved green density, and reduce shrinkage. It is also possible to prepare slurries of inorganic powders in organic liquids containing high solids contents when the slurries contain at least one additive of the present invention. Generally, these slurries may contain greater than about 50% preferably greater than about 60%, more preferably greater than about 70% by weight inorganic powder, based on the weight of the slurry.

The amount of the additive of the present invention included in the methods of the present invention may be varied over a wide range depending upon the nature of the solid particles, the additive, and materials used to form the inorganic. Generally, the methods use from about 0.01%, preferably from about 0.1%, more preferably from about 0.2% to about 30%, preferably to about 10%, more preferably to about 5% by weight of the additive, based on the weight of inorganic particles. In another embodiment, the methods use from about 0.5% to about 15% by weight of the additive based on the weight of the inorganic powder, and in some cases, the compositions may contain as little as 0.2% to about 5% by weight of the additive based on the weight of the inorganic powder. The additives are useful as dispersants, binders and/or lubricants in ceramic processing.

The additives which can be utilized in the methods of the present invention include the following: (A) at least one reaction product of a hydroxy compound with a carboxylic acylating agent; (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) at least one carboxylic acylating agent; (H) at least one aromatic acid or derivative thereof; (I) at least one aromatic oxime; and (J) at least one overbased or gelled overbased metal salt of an acidic organic compound provided that when the carboxylic acylating agent is a hydrocarbyl-substituted carboxylic acylating agent and the hydrocarbyl group contains less than an average of 40 carbon atoms, then the carboxylic acylating agent is a polycarboxylic acylating agent.

The carboxylic acylating agents useful in the present invention may be mono- or polycarboxylic acylating agents. In one embodiment, the carboxylic acylating agents are polycarboxylic acylating agents, preferably succinic acylating agents. The carboxylic acylating agents include hydrocarbyl-substituted acylating agents and polymeric carboxylic acylating agents. Polymeric carboxylic acylating agents contain carboxylic functional groups either provided by a carboxylic containing monomer, which is polymerized with another monomer to form the acylating agent or provided by adding, such as by grafting, a carboxylic containing compound, such as a monomer to a polymer. The polymeric carboxylic acylating agents are polycarboxylic acylating agents. The acylating agents may be a carboxylic acid or derivatives of the carboxylic acid such as the halides, esters, anhydrides, etc.

In the present invention, when the carboxylic acylating agent is a hydrocarbyl-substituted carboxylic acylating agent and the hydrocarbyl group contains less than an average of 40 carbon atoms, then the carboxylic acylating agent is a polycarboxylic acylating agent.

The hydrocarbyl group generally contains an average of at least about 8 carbon atoms, preferably at least about 30, more preferably at least about 35. The hydrocarbyl group contains an average of up to about 500 carbon atoms, preferably to about 300 carbon atoms, more preferably to about 200 carbon atoms. In one embodiment, the hydrocarbyl group is characterized as having an average of more than 40 carbon atoms, preferably from about 50, preferably about 60 to about 500, preferably to about 300, more preferably to about 200 carbon atoms. In another embodiment, the hydrocarbyl group is characterized by an $\overline{M}n$ (number average molecular weight) value of at least about 600. Generally, the hydrocarbyl group is characterized by an $\overline{M}n$ value of about 600, preferably about 800 to about 5000, preferably about 2500. In another embodiment $\overline{M}n$ varies between about 600 to about 1200 or 1300. Number average molecular weight ($\overline{M}n$) is determined by gel permeation chromatography.

The hydrocarbyl group may be derived from one or more olefins having from about 8 to about 30 carbon atoms. These olefins are preferably alpha-olefins (sometimes referred to as mono-1-olefins) or isomerized alpha-olefins. Examples of the alpha-olefins include 1-octene, 1-nonene, 1-decene, 1-dodecene, 1-tridecene, 1-tetradecene, 1-pentadecene, 1-hexadecene, 1-heptadecene, 1-octadecene, nonadecene, 1-eicosene, 1-henicosene, 1-docosene, 1-tetracosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. The $C_{16}$ and $C_{16-18}$ alpha-olefins are particularly preferred.

In another embodiment, the hydrocarbyl-substituted carboxylic acylating agent may have a hydrocarbyl group derived from a polyalkene. The polyalkenes include homopolymers and interpolymers of polymerizable olefin monomers of 2 to about 16 carbon atoms; usually 2 to about 6 carbon atoms. The olefins may be monoolefins such as ethylene, propylene, 1-butene, isobutene, and 1-octene; or a polyolefinic monomer, preferably diolefinic monomer, such 1,3-butadiene and isoprene. Preferably the monomers contain from 2 to about 6 carbon atoms, more preferably 2 to about 4, more preferably 4. The interpolymers include copolymers, terpolymers, tetrapolymers and the like. Preferably, the interpolymer is a homopolymer. An example of a preferred homopolymer is a polybutene, preferably a polybutene in which about 50% of the polymer is derived from isobutylene. The polyalkenes are prepared by conventional procedures.

In another embodiment the hydrocarbyl groups are derived from polyalkenes having an $\overline{M}n$ value of at least about 1300 to about 5000, and the $\overline{M}w/\overline{M}n$ value is from about 1.5, preferably from about 1.8, more preferably about 2.5 to about 4, preferably to about 3.6, more preferably to about 3.2. The preparation and use of substituted succinic acylating agents wherein the substituent is derived from such polyalkenes are described in U.S. Pat. No. 4,234,435, the disclosure of which is hereby incorporated by reference.

The hydrocarbyl-substituted acylating agents are prepared by a reaction of one or more polyalkene or olefin with one or more unsaturated carboxylic reactants. The unsaturated carboxylic reactants may contain one or more carboxyl groups, preferably one to about four, more preferably one or two. The unsaturated carboxylic reactants are generally alpha, beta unsaturated carboxylic reactants. Examples of unsaturated carboxylic reactants containing one carboxyl group include acrylic, methacrylic or crotonic acids or derivatives thereof. Examples of unsaturated carboxylic reactants having two carboxyl groups include maleic, fumaric, itaconic, citraconic acids and derivatives thereof, preferably maleic or fumaric acids or derivatives thereof. When the hydrocarbyl group of the carboxylic acylating group contains less than an average of 40 carbon atoms then the acylating agent is derived from unsaturated carboxylic reactants with two or more, preferably two carboxylic groups.

The hydrocarbyl-substituted acylating agents may be prepared by reacting one or more polyalkene or one or more olefin with the unsaturated carboxylic reactant such that there is at least one mole of unsaturated reactant for each mole of polyalkene or olefin. Preferably, an excess of unsaturated carboxylic reactant is used. This excess is generally between about 5% to about 25%.

In another embodiment, the acylating agents are prepared by reacting the above described polyalkene with an excess of maleic anhydride to provide hydrocarbyl-substituted succinic acylating agents wherein the number of succinic groups for each equivalent weight of substituent group is at least 1.3. The maximum number will not exceed 4.5. A suitable range is from about 1.4 to 3.5 and more specifically from about 1.4 to about 2.5 succinic groups per equivalent weight of substituent groups. In this embodiment, the polyalkene preferably has an $\overline{M}n$ from about 1300 to about 5000 and a $\overline{M}w/\overline{M}n$ of at least 1.5, as described above, the value of $\overline{M}n$ is preferably between about 1300 and 5000. A more preferred range for $\overline{M}n$ is from about 1500 to about 2800, and a most preferred range of $\overline{M}n$ values is from about 1500 to about 2400.

The conditions, i.e., temperature, agitation, solvents, and the like, for reacting an unsaturated carboxylic reactant with a polyalkene, are known to those in the art. Examples of patents describing various procedures for preparing useful acylating agents include U.S. Pat. Nos. 3,215,707 (Rense); 3,219,666 (Norman et al); 3,231,587 (Rense); 3,912,764 (Palmer); 4,110,349 (Cohen); and 4,234,435 (Meinhardt et al); and U.K. 1,440,219. The disclosures of these patents are hereby incorporated by reference.

The carboxylic acylating agents useful in the present invention may also be polymeric carboxylic acylating agents. Polymeric carboxylic acylating agents include carboxylic group containing copolymers and terpolymers as well as polymers grafted with the above-described unsaturated carboxylic reactants. In one embodiment, the polymeric carboxylic acylating agents are prepared by reacting an olefin with an alpha, beta-unsaturated carboxylic acid or derivative thereof. The olefins may be aliphatic or aromatic in nature and include alkenyl aromatic monomers, such as styrene, alphamethyl styrene, paramethyl styrene, paratertiarybutyl styrene, and aliphatic olefins having from 2 to about 30 carbon atoms. Preferably, the olefins contain from about 8 to about 30 carbon atoms and are described above as being useful as forming a hydrocarbyl substituent on the carboxylic acylating agent as well as forming polyalkenes.

The above-described monomers are then reacted with alpha, beta-unsaturated carboxylic acids or derivatives thereof. These compounds are described above.

These polymers are known and are described in the following U.S. Pat. Nos. 3,956,149; 3,959,159; 3,933,761; 4,526,950; 4,654,050; and 4,604,221. These patents are incorporated by reference for their disclosure to polymers and procedures for polymerizing olefins and alpha, beta-unsaturated carboxylic acids or derivatives thereof. These patents are also incorporated by reference for their disclosure to esters of these compounds.

The carboxylic acylating agent may also be a carboxylic grafted polymer, preferably a carboxylic grafted hydrocarbon polymer, more preferably a succinic substituted hydrocarbon polymer. Typically, these polymers are copolymers of aromatic monomers and diene monomers. Examples of useful hydrocarbon polymers include styrene-isoprene and styrene-butadiene copolymers. These polymers are usually hydrogenated. These polymers are described below. These polymers may be grafted with one or more of the above-described alpha, beta-unsaturated carboxylic acids or derivatives thereof by means known to those in the art. U.S. Pat. No. 4,670,173 describes grafted dispersant viscosity improvers and is incorporated by reference for its disclosure to hydrocarbon polymers, carboxylic acids or derivatives thereof and methods for grafting the hydrocarbon polymer with carboxylic acids or derivatives thereof.

The above acylating agents are reacted with at least one organic hydroxy compound of the general formula $R_1(OH)_m$ wherein $R_1$ is a monovalent or polyvalent organic group joined to the —OH groups through a carbon bond, and m is an integer of from 1 to about 10. The hydroxy compounds may be aliphatic compounds such as monohydric and polyhydric alcohols, or aromatic compounds such as phenols and naphthols. The aromatic hydroxy compounds from which the esters may be derived are illustrated by the following specific examples: phenol, beta-naphthol, alpha-naphthol, cresol, resorcinol, catechol, p,p'-dihydroxybiphenyl, 2-chlorophenol, 2,4-dibutylphenol, etc.

The alcohols (and $R_1$) from which the carboxylic esters may be derived preferably contain from 1, to about 40, preferably to about 30, more preferably to about 10. They may be monohydric alcohols such as methanol, ethanol, isooctanol, dodecanol, cyclohexanol, etc. In one embodiment, the hydroxy compounds are polyhydric alcohols, such as alkylene polyols. Preferably, the polyhydric alcohols contain from 2 to about 40 carbon atoms, preferably to about 20; and from 2 to about 10 hydroxyl groups, preferably to about 6. Polyhydric alcohols include ethylene glycols, including di-, tri- and tetraethylene glycols; propylene glycols, including di-, tri- and tetrapropylene glycols; glycerol; butanediol; hexanediol; sorbitol; arabitol; mannitol; sucrose; fructose; glucose; cyclohexane diol; erythritol; and pentaerythritols, including di- and tripentaerythritol; preferably, diethylene glycol, triethylene glycol, glycerol, sorbitol, trimethylolpropane, pentaerythritol and dipentaerythritol.

The polyhydric alcohols may be esterified with monocarboxylic acids having from 2 to about 30 carbon atoms, preferably about 8 to about 18, provided that at least one hydroxyl group remains unesterified. Examples of monocarboxylic acids include acetic, propionic, butyric and fatty carboxylic acids. The fatty monocarboxylic acids have from about 8 to about 30 carbon atoms and include octanoic, oleic, stearic, linoleic, dodecanoic and tall oil acids. Specific examples of these esterified polyhydric alcohols include sorbitol oleate, including mono- and dioleate, sorbitol stearate, including mono- and distearate, glycerol oleate, including glycerol mono-, di- and trioleate and erythritol octanoate.

The carboxylic esters (A) may be prepared by any of several known methods. One method involves the reaction of a suitable alcohol or phenol with a carboxylic acylating agent, such as a hydrocarbon-substituted succinic anhydride. The esterification is usually carried out at a temperature above about 100° C., preferably between 150° C. and 300° C. The water formed as a by-product is removed by distillation as the esterification proceeds.

The relative proportions of the acylating agent and the hydroxy compound which are to be used depend to a large measure upon the type of the product desired and the number of hydroxyl groups present in the molecule of the hydroxy compound and the number of carboxylic groups present in the acylating agent. For instance, the formation of a half ester of a succinic acid, i.e., one in which only one of the two acid groups is esterified, involves the use of one mole of a monohydric alcohol for each mole of the substituted succinic acid reactant, whereas the formation of a diester of a succinic acid involves the use of two moles of the alcohol for each mole of the acid. The hydroxy compound is usually reacted with the carboxylic acylating agent on an equal equivalent basis. An equivalent of hydroxy compound is the molecular weight of the hydroxy compound divided by the number of hydroxyl groups on the compound. The equivalent weight of a carboxylic acylating agent is determined by dividing the molecular weight of the carboxylic acylating agent by the number of carboxylic groups on the molecule. A slight excess of hydroxy compound may also be used.

The carboxylic esters (A) are prepared by reacting the carboxylic acylating agents described above with one or more hydroxy compounds in ratios of from about 0.5 equivalent to about 4 equivalents of hydroxy compound per equivalent of acylating agent. The preparation of useful carboxylic ester additive is described in U.S. Pat. Nos. 3,522,179 and 4,234,435.

The carboxylic esters (A) and methods of making the same are known in the art and are disclosed in U.S. Pat. Nos. 3,219,666; 3,381,022; 3,522,179; and 4,234,435 which are hereby incorporated by reference for their disclosures of the preparation of carboxylic ester additives.

The carboxylic esters (A) which are described above resulting from the reaction of an acylating agent with a hydroxy containing compound such as an alcohol or a phenol may be further reacted with an amine, and particularly polyamines. In one embodiment, the amount of amine which is reacted with the ester is an amount sufficient to react with the non-esterified carboxyl groups. In one preferred embodiment, the amine-modified carboxylic acid ester additives are prepared by reacting about 1.0 to 2.0 equivalents, preferably about 1.0 to 1.8 equivalents of hydroxy compounds, and to about 0.3 equivalent, preferably about 0.02 to about 0.25 equivalent of polyamine per equivalent of acylating agent.

In another embodiment, the carboxylic acylating agent may be reacted simultaneously with both the alcohol and the amine. There is generally at least about 0.01 equivalent of the alcohol and at least 0.01 equivalent of the amine although the total amount of equivalents of the combination should be at least about 0.5 equivalent per equivalent of acylating agent.

The carboxylic ester additive compositions are known in the art, and the preparation of a number of these derivatives is described in, for example, U.S. Pat. Nos. 3,957,854 and 4,234,435 which have been incorporated by reference previously.

The amine has within its structure at least one >NH or —NH$_2$ group. The amine may be a monoamine or polyamine compound. Mixtures of two or more amines may be used. Preferably, the amine contains at least one primary amino group (i.e., —NH$_2$) and more preferably the amine is a polyamine, especially a polyamine containing at least two amino groups, either or both of which are primary or secondary amino groups. The amines may be aliphatic, cycloaliphatic, aromatic or heterocyclic amines.

The monoamines generally contain from 1 to about 24 carbon atoms, with 1 to about 12 carbon atoms being more preferred, with 1 to about 6 being more preferred. Examples of monoamines useful in the present invention include methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary amines include trimethylamine, tributylamine, methyldiethylamine, ethyldibutylamine, etc.

The polyamines may be aliphatic, cycloaliphatic, heterocyclic or aromatic. Examples of the polyamines include alkylene polyamines and heterocyclic polyamines.

Alkylenepolyamines are represented by the formula

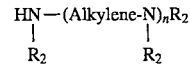

wherein n has an average value between about 1 and about 10, preferably about 2 to about 7 and the "Alkylene" group has from 1 to about 10 carbon atoms, preferably about 2 to about 6. R$_2$ is preferably an aliphatic or hydroxy-substituted aliphatic group of to about 30 carbon atoms, preferably from one to about 12, more preferably from one to about 12, still more preferably a methyl, ethyl, propyl or butyl group or hydroxy-substituted methyl, ethyl, propyl or butyl group.

Such alkylenepolyamines include methylenepolyamines, ethylenepolyamines, butylenepolyamines, propylenepolyamines, pentylenepolyamines, etc. The higher homologs and related heterocyclic amines such as piperazines and N-amino alkyl-substituted piperazines are also included. Specific examples of such polyamines are ethylenediamine, triethylenetetramine, tris-(2-aminoethyl)amine, propylenediamine, trimethylenediamine, tripropylenetetramine, tetraethylenepentamine, hexaethyleneheptamine, pentaethylenehexamine, etc.

Higher homologs obtained by condensing two or more of the above-noted alkylene amines are similarly useful as are mixtures of two or more of the above-described polyamines.

Ethylenepolyamines, such as some of those mentioned above, are useful. Such polyamines are described in detail under the heading Ethyleneamines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines. Ethylenepolyamine mixtures are useful.

The amine may also be a heterocyclic polyamine. Among the heterocyclic polyamines are aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, espeially the piperidines, piperazines, thiomorpholines, morpholines, pyrrolidines, and the like. Piperidine, aminoalkyl-substituted piperidines, piperazine, aminoalkylsubstituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylenepolyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine (DETA)), 0.72% triethylenetetramine (TETA), 21.74% tetraethylenepentamine and 76.61% pentaethylenehexamine and higher (by weight). These alkylenepolyamine bottoms include cyclic condensation products such as piperazine and higher analogs of diethylenetriamine, triethylenetetramine and the like.

These alkylene polyamine bottoms can be reacted solely with the acylating agent, in which case the amino reactant consists essentially of alkylenepolyamine bottoms, or they can be used with other amines, polyamines, or mixtures thereof.

Amines useful in the present invention are described in U.S. Pat. Nos. 3,219,666 and 4,234,435, and these patents are hereby incorporated by reference for their disclosures of amines.

Particularly effective carboxylic ester additives are prepared by reacting polybutenyl substituted succinic anhydrides derived from a polybutene ($\overline{M}n$ equals 960) with monopentaerythritol at a ratio of 1 carboxylic acid group to 1.8 hydroxyl groups. Another useful carboxylic ester is prepared by reacting the aforementioned carboxylic ester with 0.26 equivalent of a commercial ethylenepolyamine mixture having the stoichiometric equivalent to tetraethylenepentamine. The equivalence of polyamine is based on nitrogen atoms. Another useful carboxylic additive is prepared by reacting a polybutenyl substituted succinic anhydride derived from a polybutene ($\overline{M}n$ equals 1650) with monopentaerythritol and the above ethylenepolyamines at a ratio of 1 carboxylic acid to 1.7 hydroxyl groups and 0.39 equivalent of amine based on nitrogen atoms. The carboxylic additive and methods for their preparation are described in U.S. Pat. No. 4,234,435 which is hereby incorporated by reference for its teachings to carboxylic esters.

(B) Mannich Reaction Products

Mannich reaction products are formed by the reaction of at least one aldehyde, at least one of the above described amines and at least one hydroxyaromatic compound. The reaction may occur from room temperature to 225° C., usually from 50° to about 200° C. (75° C.–125° C. most preferred), with the amounts of the reagents being such that the molar ratio of hydroxyaromatic compound to formaldehyde to amine is in the range from about (1:1:1) to about (1:3:3).

The first reagent is a hydroxyaromatic compound. This term includes phenols (which are preferred), carbon-, oxygen=, sulfur- and nitrogen-bridged phenols and the like as well as phenols directly linked through covalent bonds (e.g. 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds can be used as the first reagent.

The hydroxyaromatic compounds are those substituted with at least one, and preferably not more than two, aliphatic or alicyclic groups having at least about 6 (usually at least about 30, more preferably at least 50) carbon atoms and to about 7000 carbon atoms. These groups may be derived from the above described polyalkenes. In one embodiment, the hydroxy aromatic compound is a phenol substituted with an aliphatic or alicyclic hydrocarbon based group having an $\overline{M}n$ of about 420 to about 10,000.

In one embodiment, the hydroxyaromatic compounds may be an aromatic carboxylic acid. A group of useful aromatic carboxylic acids are those of the formula

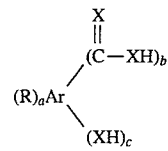

wherein R is a hydrocarbyl group; (a), (b) and (c) are each independently an integer from 1 up to 3 times the number of aromatic nuclei present in Ar with the proviso that the sum of (a) plus (b) plus (c) does not exceed the unsatisfied valencies of Ar; and Ar is an aromatic moiety which is substituted by from 0 to 3 substituents selected from the group consisting of lower alkyl, alkoxyl, nitro, halo or combinations of two or more thereof. The number of aromatic nuclei, fused, linked or both, in the above-described Ar can play a role in determining the integer values of a, b and c. For example, when Ar contains a single aromatic nucleus, a, b and c are each independently 1 to 4. When Ar contains two aromatic nuclei, a, b and c can each be an integer from 1 to 8, that is, up to three times the number of aromatic nuclei present (in naphthalene, 2). With a trinuclear aromatic moiety (Ar), a, b and c can each be an integer of 1 to 12. For instance, when Ar is a biphenyl or a naphthyl moiety, a, b and c can each independently be an integer of 1 to 8. The values of a, b and c are limited by the fact that their sum cannot exceed the total unsatisfied valences of Ar.

Accordingly, it is to be understood that the aromatic group as represented by "Ar", as well as elsewhere in other formulae in this specification and in the appended claims, can be mononuclear such as a phenyl, a pyridyl, or a thienyl, or polynuclear. The polynuclear groups can be of the fused type wherein an aromatic nucleus is fused at two points to another nucleus such as found in naphthyl, anthranyl, etc. The polynuclear group can also be of the linked type wherein at least two nuclei (either mononuclear or polynuclear) are linked through bridging linkages to each other. These bridging linkages can be chosen from the group consisting of alkylene linkages, ether linkages, keto linkages, sulfide linkages, polysulfide linkages of 2 to about 6 sulfur atoms, etc. Examples of the aromatic groups that are useful herein include the polyvalent aromatic groups derived from benzene, naphthalene, anthracene, etc., preferably benzene. Specific examples of Ar groups include phenylenes and naphthylene, e.g., methylphenylenes, ethoxyphenylenes, isopropylphenylenes, hydroxyphenylenes, dipropoxynaphthylenes, etc. The number of aromatic nuclei, fused, linked or both, in Ar can play a role in determining the integer values of a and b. For example, when Ar contains a single aromatic nucleus, the sum of a and b is from 2 to 6. When Ar contains two aromatic nuclei, the sum of a and b is from 2 to 10. With a tri-nuclear Ar moiety, the sum of a and b is from 2 to 15. The value for the sum of a and b is limited by the fact that it cannot exceed the total number of displaceable hydrogens on the aromatic nucleus or nuclei of Ar.

In one embodiment, the hydrocarbyl group (R) has an average of at least about 30, more typically, at least about 50 carbon atoms to about 400, more typically, to about 300 carbon atoms. In one embodiment, the hydrocarbyl group has a number average molecular weight from about 400, preferably from about 500, more preferably from about 700 to about 3000, preferably to about 2500, more preferably to about 1500. Number average molecular weight is determined by gel permeation chromatography. In one embodiment, R is a hydrocarbyl group as described above for (A) the reaction product of a hydroxy compound and a carboxylic acylating agent.

Illustrative hydrocarbyl groups include n-decyl, n-dodecyl, tetrapropenyl, n-octadecyl, oleyl, chlorooctadecyl, triicontanyl, etc. In another embodiment, the hydrocarbyl groups R are derived from one or more of the above-described polyalkenes or olefins. The R groups can also be derived from the halogenated (e.g., chlorinated or brominated) analogs of such polyalkenes. The R groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the R groups may be reduced or eliminated by hydrogenation according to procedures known in the art. R may also be derived from one or more of the above-described olefins.

In another embodiment, R preferably contains about 6, preferably about 8 to about 80, preferably to about 30, more preferably to about 25 carbon atoms, and more preferably to about 15 carbon atoms. Examples of R groups include butyl, isobutyl, pentyl, octyl, nonyl, dodecyl, 5-chlorohexyl, 4-ethoxypentyl, 3-cyclohexyloctyl, 2,3,5-trimethylheptyl, and substituents derived from polypropylenes, polybutylenes, propylene tetramer and tri(butene).

Within this group of aromatic acids, a useful class of carboxylic acids are those of the formula

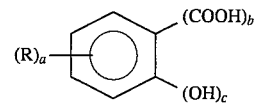

wherein a, b, c and R are defined above, a is a number in the range of from zero to about 4, preferably 1 to about 3; b is a number in the range of 1 to about 4, preferably 1 to about 2, c is a number in the range of zero to about 4, preferably 1 to about 2, and more preferably 1; with the proviso that the sum of a, b and c does not exceed 6. Preferably, R and a are such that the acid molecules contain at least an average of about 12 aliphatic carbon atoms in the aliphatic hydrocarbon substituents per acid molecule. Preferably, b and c are each one and the carboxylic acid is a salicylic acid. The salicylic acids preferably are aliphatic hydrocarbon-substituted salicyclic acids wherein each aliphatic hydrocarbon substituent contains an average of at least about 8 carbon atoms per substituent and 1 to 3 substituents per molecule.

The above aromatic carboxylic acids are well known or can be prepared according to procedures known in the art. Carboxylic acids of the type illustrated by these formulae and processes for preparing their neutral and basic metal salts are well known and disclosed, for example, in U.S. Pat. Nos. 2,197,832; 2,197,835; 2,252,662; 2,252,664; 2,714,092; 3,410,798; and 3,595,791.

The second reagent is a hydrocarbon-based aldehyde, preferably a lower aliphatic aldehyde (e.g., containing 1 to about 7 carbon atoms). Suitable aldehydes include formaldehyde, benzaldehyde, acetaldehyde, the butyraldehydes, hydroxybutyraldehydes and heptanals, as well as aldehyde precursors (i.e., aldehyde synthons) which react as aldehydes under the conditions of the reaction such as paraformaldehyde, paraldehyde, trioxane, formalin and methal. Formaldehyde and its polymers (e.g., paraformaldehyde, trioxane) are preferred. Mixtures of aldehydes may be used as the second reagent.

The third reagent is any amine described above. Preferably the amine is a polyamine as described above.

A useful Mannich reaction product is prepared by reacting 1.5 equivalents of a polybutenyl substituted phenol, derived from a polybutene ($\overline{M}n$ equals 885), with 3 equivalents of paraformaldehyde and 4.2 equivalents of an ethylenepolyamine having an average stoichiometric structure equivalent to tetraethylenepentamine.

Mannnich reaction products are described in the following patents: U.S. Pat. No. 3,980,569; U.S. Pat. No. 3,877,899; and U.S. Pat. No. 4,454,059 (herein incorporated by reference for their disclosure to Mannich additives).

(C) Hydrocarbyl-substituted Amine Additives

The additive may also be a hydrocarbyl-substituted amine additive. These hydrocarbyl-substituted amines are well known to those skilled in the art. These amines are disclosed in U.S. Pat. Nos. 3,275,554; 3,438,757; 3,454,555; 3,565,804; 3,755,433; and 3,822,289. These patents are hereby incorporated by reference for their disclosure of hydrocarbyl amines and methods of making the same. Typically, amine additives are prepared by reacting the above-identified olefins and the above-identified olefin polymers (polyalkenes) or chlorinated derivatives thereof with amines (mono- or polyamines). The amines may be any of the amines described, preferably the above-described ethylenepolyamines. Examples of the hydrocarbyl-substituted amine additives include poly(propylene)amine; N,N-dimethyl-N-poly(ethylene/propylene)amine, (50:50 mole ratio of monomers); polybutene amine; N,N-di(hydroxyethyl)-N-polybutene amine; N-(2-hydroxypropyl)-N-polybutene amine; N-polybutene-aniline; N-polybutenemorpholine; N-poly-(butene)ethylenediamine; N-poly(propylene)trimethylenediamine; N-poly(butene)diethylenetriamine; N',N'-poly-(butene)tetraethylenepentamine; N,N-dimethyl-N'-poly(propylene)-1,3-propylenediamine and the like.

(D) Aminophenol

While the term "phenol" is used herein, it is to be understood that this term is not intended to limit the aromatic group of the phenol to benzene.

Preferably, the aminophenol is represented by the formula

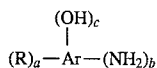

wherein R, a, b, c and Ar are as defined above.

In the preferred embodiment, the aminophenols used in this invention contain one each of the foregoing substituents (i.e., a, b and c are each one) and Ar is a single aromatic ring, preferably benzene. This preferred class of aminophenols can be represented by the formula

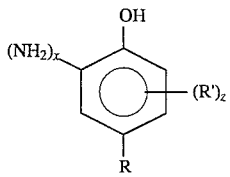

wherein R is defined above; R' is a member selected from the group consisting of lower alkyl, lower alkoxyl, carboalkoxy nitro, nitroso and halo; x is 0 or 1; and z is 0 or 1. Generally, the R group is located ortho or para to the hydroxyl group, and z is usually 0. Most often, there is only one amino group in the aminophenol used in the invention, i.e., x equals 0.

The aminophenols can be prepared by a number of synthetic routes. For example, an aromatic hydrocarbon or a phenol may be alkylated and then nitrated to form an intermediate. The intermediate may be reduced by any means known to those in the art. The alkylated aromatic hydrocarbon nitro intermediate may be reacted with water to form hydroxyl-nitro alkylated aromatics which may then be reduced to aminophenols as is known to those skilled in the art.

Typically the aminophenols used in this invention are obtained by reduction of nitrophenols with hydrazine or hydrogen in the presence of a metallic catalyst such as discussed above. This reduction is generally carried out at temperatures of about 15°–250° C., typically, about 50°–150° C. When using hydrogen, the hydrogen pressures are about 0–2000 psig, typically, about 50–250 psig. The reaction time for reduction usually varies between about 0.5–50 hours substantially inert liquid diluents and solvents, such as ethanol, cyclohexane, etc., can be used to facilitate the reaction. The aminophenol product is recovered by well known techniques such as distillation, filtration, extraction, and so forth.

The reduction is carried out until at least about 50%, usually about 80%, of the nitro groups present in the nitro intermediate mixture are converted to amino groups. The typical route to the aminophenols of this invention just described can be summarized as (1) nitrating with at least one nitrating agent at least one compound of the formula: $(R)_a$—Ar—$(OH)_c$ wherein a, c, R and Ar are as defined above and Ar has 0 to 3 optional substituents (R') as defined above and (2) reducing at least about 50% of the nitro groups in said first reaction mixture to amino groups.

(E) Reaction Products of a Nitrophenol and an Amino Compound

The additive may also be the reaction product of a nitrophenol and an amino compound. The nitrophenol may be represented by the following formula:

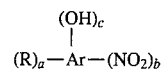

wherein a, b, c, R and Ar are as defined above. In a preferred embodiment the nitrophenols used in this invention contain a single aromatic ring, most preferably a benzene ring. This preferred class of nitrophenols can be represented by the formula:

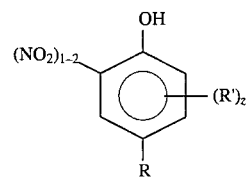

wherein R, R' and z and are as defined above.

The nitrophenols used in this invention can be prepared by a number of known synthetic routes. Various routes for preparing nitrophenols are known to those skilled in the art.

The amino compound which is reacted with the nitrophenol may be one or more of the above-described amines or the above nitrogen-containing additives.

To make the reaction product of a nitrophenol and an amino compound, at least one nitrophenol is condensed with at least one of the above-described amines. The reaction is a condensation reaction which is continued until the reaction product is substantially free of nitro groups. The reaction is generally carried out at a temperature of 25° C. up to the decomposition temperature of the reaction mixture of the individual components. Generally, this temperature is below 250° C., preferably between 50°–175° C.

When the nitrophenol contains less than about 15 carbon atoms per nitro group per molecule it is desirable to conduct the initial part of the condensation at a lower temperature (e.g., 0° C. to 50° C.) and with care since violent reaction is possible. Generally, at least half of an equivalent of nitrophenol is used for each equivalent of amino compound. Usually it is not advantageous to use more than three equivalents of nitro compound per equivalent of amino compound or eight equivalents of amino compound per equivalent of nitrophenol.

In a typical embodiment, the total amounts of nitrophenol and amino compound employed in the condensation are in a ratio of about 0.5–10 equivalents of amino compound per mole of nitrophenol, preferably about 1.0–5.

(F) Basic Nitrogen-Containing Polymers

The basic nitrogen-containing polymers useful in the present invention are polymer backbones which are functionalized by reacting with an amine source. A true or normal block copolymer or a random block copolymer, or combinations of both are utilized. They are hydrogenated before use in this invention to remove virtually all of their olefinic double bonds. Techniques for accomplishing this hydrogenation are well known to those of skill in the art. Briefly, hydrogenation is accomplished by contacting the copolymers with hydrogen at superatmospheric pressures in the presence of a metal catalyst such as colloidal nickel, palladium supported on charcoal, etc.

In general, it is preferred that these block copolymers, for reasons of oxidative stability, contain no more than about 5 percent and preferably no more than about 0.5 percent residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation, as determined by the aforementioned analytical techniques. These polymers include styrene-isoprene and styrene-butadiene copolymers.

The block copolymers typically have number average molecular weights ($\overline{Mn}$) in the range of about 10,000 to about 500,000 preferably about 30,000 to about 200,000. The weight average molecular weight ($\overline{Mw}$) for these copolymers is generally in the range of about 50,000 to about 500,000, preferably about 30,000 to about 300,000. Weight average molecular weight is determined by gel permeation chromatography.

The above polymers may be reacted with an unsaturated carboxylic reagent as described for the hydrocarbon-substituted and polymeric carboxylic acylating agents above. This functionalized polymer may then be reacted with a primary amine containing compound. In another embodiment, the above polymers may be reacted with an unsaturated amine containing compound. Examples of compounds which may be reacted directly with the above polymers include N-(3, 6-dioxaheptyl) maleimide, N-(3-dimethylaminopropyl)-maleimide, and N-(2-methoxyethoxyethyl) maleimide.

The unsaturated carboxylic reagent generally contains an alpha-beta olefinic unsaturation and are described above. A preferred alpha-beta olefinic unsaturated carboxylic acid reagent is maleic anhydride.

Exemplary of primary amine-containing compounds include ammonia, N,N-dimethylhydrazine, methylamine, ethylamine, butylamine, 2-methoxyethylamine, N,N-dimethyl-1,3-propanediamine, N-ethyl- N-methyl-1,3-propanediamine, N-methyl-1,3-propanediamine, N-(3-aminopropyl)morpholine, 3-methoxypropylamine, 3-isobutyoxypropylamine and 4,7-dioxyoctylamine, N-(3-aminopropyl)-N-1-methylpiperazine, N-(2-aminoethyl)piperazine, (2-aminoethyl)pyridines, aminopyridines, 2-aminoethylpyridines, 2-aminomethylfuran, 3-amino-2-oxotetrahydrofuran, N-(2-aminoethyl)pyrolidine, 2-aminomethylpyrrolidine, 1-methyl-2-aminomethylpyrrolidine, 1-amino-pyrrolidine, 1-(3-aminopropyl)-2-methylpiperidine, 4-aminomethylpiperidine, N-(2-aminoethyl)morpholine, 1-ethyl-3-aminopiperidine, 1-aminopiperidine, N-aminomorpholine, and the like. Of these compounds, N-(3-aminopropyl)morpholine and N-ethyl-N-methyl-1,3-propanediamine are preferred with N,N-dimethyl-1,3-propanediamine are preferred.

Another group of primary amine-containing compounds are the various amine terminated polyethers. The amine terminated polyethers are available commercially from Texaco Chemical Company under the general trade designation "Jeffamine®". Specific examples of these materials include Jeffamine® M-600; M-1000; M-2005; and M-2070 amines.

Examples of basic nitrogen-containing polymers are given in the following references:

| | |
|---|---|
| EP 171,167 | 3,687,905 |
| 3,687,849 | 4,670,173 |
| 3,756,954 | 4,320,012 |
| 4,320,019 | |

(herein incorporated by reference for their disclosure to nitrogen-containing polymers).

(G) Aromatic Carboxylic Acid or Derivative Thereof

The additives useful in the present invention may also be an aromatic carboxylic acid or derivative thereof. These useful aromatic carboxylic acids are described above.

Examples of aromatic carboxylic acids or derivatives thereof include salicylic, phthalic, terphthalic, and benzoic acids or derivatives thereof. Preferably, the aromatic carboxylic acid or derivative thereof is one of the above-described salicylic acids or derivatives thereof.

(H) Oxime

The additive may also be an oxime. The oxime is preferably represented by the following formula:

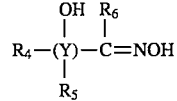

wherein $R_4$, $R_5$ and $R_6$ are independently hydrogen or hydrocarbyl and Y is an aromatic or substituted aromatic group with the proviso that the hydroxy group is attached to a carbon which is no more than three carbons removed from the oximidoyl group.

Examples of oximes useful in the present invention include 2-hydroxy-3-methyl-5-ethylbenzophenoneoxime, 5-heptylsalicylaldoxime, 5-nonylsalicylaldoxime, 2-hydroxyl- 3,5-dinonylbenzophenoneoxime, 5-dodecylsalicylaldoxime, 2-hydroxy-5-nonylbenzophenoneoxime, 5-$C_{16}$ to $C_{200}$ polybutenylsalicylaldoxime and the like or mixtures thereof. The preparation for the above oximes has been described in the literature and is disclosed in U.S. Pat. Nos. 3,981,966; 3,925,472; 4,020,106; 4,043,882; and 4,142,952 which disclosures relate to oximes and their preparation are hereby incorporated by reference. The bulk of oximes are prepared by converting the corresponding ketone or aldehyde with hydroxylamine or precursor thereof, such as its various salts, e.g., hydrochloride salt, to form the desired oxime.

(I) Overbased or Gelled Overbased Metal Salts

The methods of the present invention also may use an overbased or gelled overbased metal salt. These materials act as suspension aids, sintering aids, dispersants, binders, lubricants and/or thixotropes in the present invention. These materials act to suspend the inorganic powder within the slurry prepared in accordance with the present invention. Overbased metal salts are generally referred to as Newtonian colloidal disperse systems and gelled overbased materials are generally referred to as non-Newtonian colloidal disperse systems. The presence of the metal salts in the dispersions also facilitates the re-slurrying or re-suspension of any solids which settle out on standing over extended periods of time.

In another embodiment, the salts are basic salts, generally referred to as overbased salts. Overbased materials are referred to and generally behave like single phase, homogeneous Newtonian systems characterized by a metal content in excess of that which would be present according to the stoichiometry of the metal and the particular organic compound reacted with the metal.

The amount of excess metal is commonly expressed in metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5. The basic salts of the present invention have a metal ratio from about 1.1, preferably from about 1.5, more preferably from about 3 to about 40, preferably to about 30, more preferably to about 20.

The overbased materials are prepared by reacting an acidic material, typically carbon dioxide, with a mixture comprising an acidic organic compound, a reaction medium comprising at least one inert, an organic solvent for the organic material, a stoichiometric excess of the metal compound, and a promoter. The acidic organic compounds useful in making the overbased compositions of the present invention include carboxylic acids, sulfonic acids, phosphorus acids, phenols or mixtures of two or more thereof. Preferably, the acidic organic compounds are carboxylic acids or sulfonic acids with sulfonic acids more preferred. The carboxylic and sulfonic acids may have substituent groups derived from the above described polyalkenes.

The carboxylic acids may be aliphatic or aromatic, mono- or polycarboxylic acid or acid-producing compounds. These Carboxylic acids are described above as carboxylic acylating agents and aromatic acids or derivatives thereof. The acid-producing compounds include anhydrides, lower alkyl esters, acyl halides, lactones and mixtures thereof unless otherwise specifically stated.

The carboxylic acids suitable for use in making the overbased salts are well known in the art and have been described in detail, for example, in the following U.S., British and Canadian patents: U.S. Pat. Nos. 3,024,237; 3,172,892; 3,219,666; 3,245,910; 3,271,310; 3,272,746; 3,278,550; 3,306,907; 3,312,619; 3,341,542; 3,367,943; 3,374,174; 3,381,022; 3,454,607; 3,470,098; 3,630,902; 3,755,169; 3,912,764; and 4,368,133; British Patents 944,136; 1,085,903; 1,162,436; and 1,440,219; and Canadian Patent 956,397. These patents are incorporated herein by reference for their disclosure of carboxylic acids and methods for making the same.

Illustrative carboxylic acids include palmitic acid, stearic acid, myristic acid, oleic acid, linoleic acid, behenic acid, hexatriacontanoic acid, tetrapropylenyl-substituted glutaric acid, polybutenyl ($\overline{M}n$=200–1,500, preferably 300–1,000)-substituted succinic acid, polypropylenyl, ($\overline{M}n$=200–1,000, preferably 300–900)-substituted succinic acid, octadecyl-substituted adipic acid, chlorostearic acid, 9-methylstearic acid, dichlorostearic acid, stearyl-benzoic acid, eicosane-substituted naphthoic acid, dilauryl-decahydronaphthalene carboxylic acid, mixtures of these acids, their alkali and alkaline earth metal salts, and/or their anhydrides. Aliphatic fatty acids include the saturated and unsaturated higher fatty acids containing from about 12 to about 30 carbon atoms. Illustrative of these acids are lauric acid, palmitic acid, oleic acid, linoletic acid, linolenic acid, oleostearic acid, stearic acid, myristic acid, and undecalinic acid, alpha-chlorostearic acid, and alphanitrolauric acid.

In another embodiment, the carboxylic acid is an alkylalkyleneglycol-acetic acid, more preferably alkylpoly-ethyleneglycol-acetic acid. Some specific examples of these compounds include: iso-stearylpentaethyleneglycolacetic acid; iso-stearyl-O-$(CH_2CH_2O)_5CH_2CO_2Na$; lauryl-O-$(CH_2CH_2O)_{2.5}$-$CH_2CO_2H$; lauryl-O-$(CH_2CH_2O)_{3.3}CH_2CO_2H$; oleyl-O-$(CH_2C$-$H_2O)_4$-$CH_2CO_2H$; lauryl-O-$(CH_2CH_2O)_{4.5}CH_2CO_2H$; lauryl-O$(CH_2CH_2O)$-$_{10}CH_2CO_2H$; lauryl-O-$(CH_2CH_2O)_{16}CH_2CO_2H$; octyl-phenyl-O-$(CH_2CH_2O)_8CH_2CO_2H$; octyl-phenyl-O-$(CH_2CH_2O)_{19}CH_2CO_2H$; 2-octyl-decanyl-O-$(CH_2CH_2O)_6CH_2CO_2H$. These acids are available commercially from Sandoz Chemical under the tradename Sandopan acids.

The sulfonic acids useful in making the overbased salts include the sulfonic and thiosulfonic acids. Generally they are salts of sulfonic acids. The sulfonic acids include the mono- or polynuclear aromatic or cycloaliphatic compounds. The oil-soluble sulfonates can be represented for the most part by one of the following formulae: $R_7$—T—$(SO_3)_d$ and $R_8$-$(SO_3)_e$, wherein T is a cyclic nucleus such as, for example, benzene, naphthalene, anthracene, diphenylene oxide, diphenylene sulfide, petroleum naphthenes, etc.; $R_7$ is an aliphatic group such as alkyl, alkenyl, alkoxy, alkoxyalkyl, etc.; $(R_7)$+T contains a total of at least about 15 carbon atoms; $R_8$ is an aliphatic hydrocarbyl group containing at least about 15 carbon atoms and d and e are each independently an integer from 1 to about 3, preferably 1. Examples of $R_8$ are alkyl, alkenyl, alkoxyalkyl, carboalkoxyalkyl, etc. Specific examples of $R_8$ are groups derived from petrolatum, saturated and unsaturated paraffin wax, and the above-described polyalkenes. The groups T, $R_7$, and $R_8$ in the above Formulae can also contain other inorganic or organic substituents in addition to those enumerated above such as, for example, hydroxy, mercapto, halogen, nitro, amino, nitroso, sulfide, disulfide, etc. In the above Formulae, d and e are at least 1.

Illustrative examples of these sulfonic acids include monoeicosane-substituted naphthalene sulfonic acids, dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polybutenyl, having a number average molecular weight ($\overline{M}n$) in the range of about 500, preferably about 800 to about 5000, preferably about 2000, more preferably about 1500, with chlorosulfonic acid, nitronaphthalene sulfonic acid, paraffin wax sulfonic acid, cetyl-cyclopentane, sulfonic acid, lauryl-cyclohexane sulfonic acids, polyethylenyl ($\overline{M}n$=300–1,000, preferably 750) sulfonic acids, etc. Normally the aliphatic groups will be alkyl and/or alkenyl groups such that the total number of aliphatic carbons is at least about 8, preferably at least 12.

A preferred group of sulfonic acids are mono-, di-, and tri-alkylated benzene and naphthalene (including hydrogenated forms thereof) sulfonic acids. Illustrative of synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, polybutenyl-substituted sulfonic acid, polypropylenyl-substituted sulfonic acids of $\overline{M}n$=300–1000, preferably 500–700, cetylchlorobenzene sulfonic acid, di-cetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

Specific examples of oil-soluble sulfonic acids are mahogany sulfonic acids; bright stock sulfonic acids; sulfonic acids derived from lubricating oil fractions having a Saybolt viscosity from about 100 seconds at 100° F. to about 200 seconds at 210° F.; petrolatum sulfonic acids; mono- and poly-wax-substituted sulfonic and polysulfonic acids of, e.g., benzene, naphthalene, phenol, diphenyl ether, naphthalene disulfide, etc.; other substituted sulfonic acids such as alkyl benzene sulfonic acids (where the alkyl group has at least 8 carbons), cetylphenol mono-sulfide sulfonic acids, dilauryl beta naphthyl sulfonic acids, and alkaryl sulfonic acids such as dodecyl benzene "bottoms" sulfonic acids.

Dodecyl benzene "bottoms" sulfonic acids are the material leftover after the removal of dodecyl benzene sulfonic acids that are used for household detergents. These materials are generally alkylated with higher oligomers. The bottoms may be straight-chain or branched-chain alkylates with a straight-chain dialkylate preferred.

The production of sulfonates from detergent manufactured by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, N.Y. (1969).

The phosphorus-containing acids useful in making the overbased salts include any phosphorus acids such as phosphoric acid or esters; and thiophosphorus acids or esters, including mono and dithiophosphorus acids or esters. Preferably, the phosphorus acids or esters contain at least one, preferably two, hydrocarbyl groups containing from 1 to about 50 carbon atoms, typically 1, preferably 3, more preferably about 4 to about 30, preferably to about 18, more preferably to about 8.

In one embodiment, the phosphorus-containing acids are dithiophosphoric acids which are readily obtainable by the reaction of phosphorus pentasulfide ($P_2S_5$) and an alcohol or a phenol. The reaction involves mixing at a temperature of about 20° C. to about 200° C. four moles of alcohol or a phenol with one mole of phosphorus pentasulfide. Hydrogen sulfide is liberated in this reaction. The oxygen-containing analogs of these acids are conveniently prepared by treating the dithioic acid with water or steam which, in effect, replaces one or both of the sulfur atoms with oxygen.

In a preferred embodiment, the phosphorus-containing acid is the reaction product of the above polyalkenes and phosphorus sulfide. Useful phosphorus sulfide-containing sources include phosphorus pentasulfide, phosphorus sesquisulfide, phosphorus heptasulfide and the like.

The reaction of the polyalkene and the phosphorus sulfide generally may occur by simply mixing the two at a temperature above 80° C. preferably between 100° C. and 300° C. Generally, the products have a phosphorus content from about 0.05% to about 10%, preferably from about 0.1% to about 5%. The relative proportions of the phosphorus sulfide to the olefin polymer is generally from 0.1 part to 50 parts of the phosphorus sulfide per 100 parts of the olefin polymer.

The phosphorus-containing acids useful in the present invention are described in U.S. Pat. No. 3,232,883 issued to Le Suer. This reference is herein incorporated by reference for its disclosure to the phosphorus-containing acids and methods for preparing the same.

The phenols useful in making the overbased salts of the invention can be represented by the formula $(R)_f$—Ar—$(OH)_g$, wherein R and Ar are defined above; f and g are independently numbers of at least one, the sum of f and g being in the range of two up to the number of displaceable hydrogens on the aromatic nucleus or nuclei of Ar. Preferably, f and g are independently numbers in the range of 1 to about 4, more preferably 1 to about 2. R and f are preferably such that there is an average of at least about 8 aliphatic carbon atoms provided by the R groups for each phenol compound. Examples of phenols include octylphenol, nonylphenol, propylene tetramer substituted phenol, tri(butene)-substituted phenol, polybutenyl-substituted phenol and polypropenyl-substituted phenol.

The metal compounds used in preparing the overbased materials are normally the basic salts of alkali, alkaline earth, transition, rare-earth metals or mixtures thereof. The anionic portion of the salt can be hydroxyl, oxide, carbonate, acetate, formate, hydrogen carbonate, nitrate, sulfite, hydrogen sulfite, halide, amide, sulfate, etc. Examples of metals include alkali, alkaline earth and transition metals such as sodium, potassium, lithium, calcium, magnesium, barium, yttrium, lead, aluminum, preferably calcium or yttrium, more preferably calcium. Preferred overbased materials are prepared from the metal oxides, hydroxides, and alcoholates such as the alkaline earth, i.e., calcium, oxides, hydroxides, and alcoholates including the calcium lower alkoxides having from 1 to about 7 carbon atoms.

The promoters, that is, the materials which facilitate the incorporation of the excess metal into the overbased material, are also quite diverse and well known in the art. A particularly comprehensive discussion of suitable promoters is found in U.S. Pat. Nos. 2,777,874, 2,695,910, 2,616,904, 3,384,586 and 3,492,231. These patents are incorporated by reference for their disclosure of promoters. In one embodiment, promoters include the alcoholic and phenolic promoters. The alcoholic promoters include the alkanols of one to about 12 carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Acidic materials, which are reacted with the mixture of acidic organic compound, promoter, metal compound and reactive medium, are also disclosed in the above cited patents, for example, U.S. Pat. No. 2,616,904. Included within the known group of useful acidic materials are liquid acids such as formic acid, acetic acid, nitric acid, boric acid, sulfuric acid, hydrochloric acid, hydrobromic acid, carbamic acid, substituted carbamic acids, etc. Acetic acid is a very useful acidic material although inorganic acidic compounds such as HCl, $SO_2$, $SO_3$, $CO_2$, $H_2S$, $N_2O_3$, etc., are ordinarily employed as the acidic materials. Preferred acidic materials are carbon dioxide and acetic acid, more preferably carbon dioxide.

The methods for preparing the overbased materials as well as an extremely diverse group of overbased materials are well known in the prior art and are disclosed, for example, in the following U.S. Pat. Nos.: 2,616,904; 2,616,905; 2,616,906; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful in producing the disperse systems of this invention and are, accordingly, incorporated herein by reference for these disclosures.

The temperature at which the acidic material is contacted with the remainder of the reaction mass depends to a large measure upon the promoting agent used. With a phenolic promoter, the temperature usually ranges from about 80° C. to about 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter.

As previously mentioned, the overbased materials are single phase homogeneous systems. However, depending on the reaction conditions and the choice of reactants in preparing the overbased materials, insoluble contaminants sometimes are present in the product. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. In another embodiment, the contaminants may be removed by mixing the gelled overbased salts with an acidic material such as carbon dioxide or an acidic organic compound such as carboxylic or sulfonic acid. It should be understood, however, that the removal of these contaminants, while desirable for reasons just mentioned, is not an absolute essential aspect of the invention and useful products can be obtained when overbased materials containing insoluble contaminants are converted to the gelled overbased metal salts.

Broadly speaking, the gelled overbased metal salts of the invention are prepared by treating an overbased organic compound with a conversion agent, usually an active hydrogen containing compound. The gelling operation is accomplished through thorough mixing of the overbased salt and a conversion agent, i.e., homogenization. This treatment converts these overbased metal salts into the gelled overbased metal salt utilized in the compositions of the present invention.

Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, the reaction temperature does not exceed about 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed.

The conversion agents include lower aliphatic carboxylic acids or anhydrides, water, aliphatic alcohols, cycloaliphatic alcohols, arylaliphatic alcohols, phenols, ketones, aldehydes, amines, including alkyl, cycloalkyl and aryl amines, boron acids, phosphorus acids, and carbon dioxide. Mixtures of two or more of these conversion agents are also useful. Particularly useful conversion agents are discussed below.

The lower aliphatic carboxylic acids are those containing less than about 8 carbon atoms in the molecule. Examples of this class of acids are formic acid, acetic acid, propionic acid, butyric acid, preferably formic acid, acetic acid, or propionic acid, more preferably acetic acid.

Useful alcohols include aliphatic, cycloaliphatic, and arylaliphatic mono- and polyhydroxy alcohols. Alcohols having less than about 12 carbons are especially useful while the lower alkanols, i.e., alkanols having less than about 8 carbon atoms are preferred for reasons of economy and effectiveness in the process. Generally, the alcohols include methanol, ethanol, isopropanol, n-propanol, isobutanol, tertiary butanol, and amyl alcohol, preferably methanol and isopropyl alcohol.

The use of a mixture of water and one or more of the alcohols is especially effective for converting the overbased material to gelled overbased material. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol, preferably methanol and isopropyl alcohol, is present in the alcohol component of these water-alkanol mixtures. Water-alkanol mixtures wherein the alcoholic portion is one or more lower alkanols are especially suitable.

The conversion agents or a proportion thereof may be retained in the colloidal disperse system. The conversion agents are however, not essential components of these disperse systems. From the standpoint of uniform results, it is usually desirable that as little of the conversion agents as possible be retained in the disperse systems. Since these conversion agents do not react with the overbased material in such a manner as to become permanently bounded, it is normally a simple matter to remove a major proportion of the conversion agents and, generally, substantially all of the conversion agents. Since the liquid conversion agents are generally more volatile than the remaining components of the disperse system, they are readily removable by conventional devolatilization techniques, e.g., heating, heating at reduced pressures, and the like.

The overbased metal salts, gelled overbased salts and methods for preparing the same are disclosed in U.S. Pat. Nos. 3,384,586 and 3,492,231. These patents are incorporated by reference for their disclosure to these salts and methods of making the same.

The following examples illustrate the overbased and gelled overbased metal salts of the present invention. Where applicable, section (a) of each example illustrates overbased metal salts and section (b) illustrates gelled overbased metal salts.

EXAMPLE 1

(a) A mixture of 3185 parts of methanol, 28.25 parts of calcium chloride and 226.5 parts of tap water is prepared in a glass-lined reactor equipped with a heating mantle, thermocouple, metal stirrer, gas inlet tube and condenser. The mixture is heated to 48° C. with stirring. Silo lime (644.5 parts, 94% calcium hydroxide) is added to the mixture to provide a slurry. The temperature of the mixture is reduced to 45° C., and 7075 parts of polypropylene ($\overline{M}w=337$) substituted benzene sulfonic acid are added to the mixture over a period of one hour. The temperature of the mixture reaches 46° C. The mixture is stirred for one-half hour. SC Solvent 100 (6275 parts, a high-boiling alkylated aromatic solvent supplied by Ohio Solvents) is added to the mixture, and the mixture is stirred for 15 minutes. Three increments of 1772.75 parts of Silo lime are added to the mixture. Carbon dioxide at a rate of five standard cubic feet per hour is bubbled through the mixture after each increment. Total blowing with carbon dioxide is approximately 10.5 hours with the temperature of the mixture varying from 40° C. to 50° C. The mixture is stripped with nitrogen blowing at a rate of two standard cubic feet per hour while heating to reflux over a nine-hour period, the temperature increasing over said period from 47° C. to 160° C. The mixture is cooled to room temperature. The mixture is filtered through a Gyro Tester clarifier. The solids content is adjusted to 70% solids with SC Solvent 100.

(b) Into a glass-lined reactor equipped with a heating mantle, thermocouple, gas inlet tube, condenser and metal stirrer, there is added 15,000 parts of the product prepared in (a), and the product is heated to 40° C. with stirring. Carbon dioxide is bubbled through the mixture at a rate of one cubic foot per hour for 3.75 hours, the temperature of the mixture varying from 38° C. to 46° C. during the carbon dioxide blowing. 847.8 parts of isopropyl alcohol, 847.8 parts of methanol and 1304 parts of distilled water are added to the mixture over a five-minute period. The mixture temperature increases exothermically to 45° C., and is then heated to 67° C. 2500 parts of SC Solvent 100 are added to the mixture. The mixture is heated to 78° C. and maintained at said temperature for 0.5 hour. The mixture is stripped by bubbling nitrogen at a rate of two standard cubic feet per hour through the mixture over a period of 5.5 hours, the temperature of the mixture increasing from 77° C. to 155° C. during stripping. The mixture is cooled with cooling water, and 16,700 parts of a gelled product having a solids content of 62.5% by weight are obtained.

EXAMPLE 2

Twelve-hundred parts of the product of Example 3 are placed in a resin reactor equipped with a heating mantle, metal stirrer, teflon bearing, gas inlet tube, thermocouple, trap and condenser. Polypropylene ($\overline{Mn}$=337) substituted benzene sulfonic acid (225.5 parts) is added to the mixture over a 10-minute period, and the mixture exotherms to 34° C. The temperature of the mixture is maintained at 34° C. for 20 minutes. Water is stripped from the mixture by bubbling nitrogen at a rate of two standard cubic feet per hour through the mixture. The trap is filled with SC Solvent 100 to prevent solvent loss. The temperature increases to 162° C. over a two-hour period during stripping. The temperature is then maintained at 162° C. for 0.5 hour. 7.5 cubic centimeters of water are collected. The mixture is cooled to room temperature, and 1413 parts of a low oil overbased sulfonate gel with a zero base number are obtained.

EXAMPLE 3

A solution of 780 parts (1 equivalent) of an alkylated benzenesulfonic acid ($\overline{Mn}$=385) and 19 parts of the polybutenyl succinic anhydride in 442 parts of mineral oil is mixed with 800 parts (20 equivalents) of sodium hydroxide and 704 parts (22 equivalents) of methanol. The mixture is blown with carbon dioxide at 7 cfh (cubic feet per hour) for 11 minutes as the temperature slowly increases to 97° C. The rate of carbon dioxide flow is reduced to 6 cfh and the temperature decreases slowly to 88° C. over about 40 minutes. The rate of carbon dioxide flow is reduced to 5 cfh for about 35 minutes and the temperature slowly decreases to 73° C. The volatile materials are stripped by blowing nitrogen through the carbonated mixture at 2 cfh. for 105 minutes as the temperature is slowly increased to 160° C. After stripping is completed, the mixture is held at 160° C. for an additional 45 minutes and then filtered to yield an oil solution of the desired basic sodium sulfonate having a metal ratio of about 19.75. This solution contains 18.7% oil.

EXAMPLE 4

A reaction vessel is charged with 318 parts (0.32 equivalent) of Sandopan RA-12 (an alkylpolyethylene glycol acetic acid available from Sandoz Chemical), 12 parts (0.32 equivalent) of yttrium pentoxide, 50 parts of toluene. The mixture is heated to reflux and held for three hours while 20 parts of water is collected. The reaction is cooled to 60° C. and filtered through diatomaceous earth. The filtrate is vacuum stripped to 120° C. and 25 parts of mercury. The residue has a neutralization base number to bromophenolblue of 54 and a neutralization acid number to phenolphthalein of 42.

A reaction vessel is charged with 272 parts (0.26 equivalent) of the above product, 39.8 parts (1.05 equivalents) of yttrium trioxide, 400 parts of toluene, and 25 parts of methanol. The mixture is heated at 45° C. where 2 parts of acetic acid and 25 parts of water are added to the mixture. Carbon dioxide is blown through the solution. The reaction mixture is stripped to remove methanol, water and acetic acid. Ammonium hydroxide (5 parts) is added to the mixture and carbon dioxide sparging is continued. The solvents are removed and the reaction temperature is raised to 115° C. The product has a 150 neutralization base number to bromophenolblue (theoretical 206) and 11.4 percent ash (theoretical 13.8).

The above additives may be post-treated with one or more post-treating reagents selected from the group consisting of boron trioxide, boron anhydrides, boron halides, boron acids, boron amides, esters of boric acids, carbon disulfide, hydrogen sulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds with phenols, and sulfur with phenols.

The following U.S. Patents are expressly incorporated herein by reference for their disclosure of posttreating processes and post-treating reagents: U.S. Pat. Nos. 3,087, 936; 3,254,025; 3,256,185; 3,278,550; 3,282,955; 3,284, 410; 3,338,832; 3,533,945; 3,639,242; 3,708,522; 3,859, 318; 3,865,813; etc. U.K. Patent Nos. 1,085,903 and 1,162, 436 also describe such processes.

In one embodiment, the additives are post-treated with at least one boron compound. The reaction of the additive with the boron compounds can be effected simply by mixing the reactants at the desired temperature. Ordinarily it is preferably between about 50° C. and about 250° C. In some instances it may be 25° C. or even lower. The upper limit of the temperature is the decomposition point of the particular reaction mixture and/or product.

The amount of boron compound reacted with one of additives generally is sufficient to provide from about 0.1 to about 10 atomic proportions of boron for each equivalent of the additive, such as the atomic proportion of nitrogen or hydroxyl group of the additive. The preferred amounts of reactants are such as to provide from about 0.5 to about 2 atomic proportions of boron for each equivalent of additive. To illustrate, the amount of a boron compound having one boron atom per molecule to be used with one mole of an amine additive having five nitrogen atoms per molecule is within the range from about 0.1 mole, preferably about 0.5 mole, to about 50 moles, preferably to about 10 moles.

The following example is illustrative of the post-treated components useful in this invention and to methods of preparing the same.

EXAMPLE 5

The sodium carbonate overbased (20:1 equivalent) sodium sulfonate of Example 10 is mixed with a diluent oil in a suitable reaction vessel. The diluent oil is a 100 neutral mineral oil. The mixture of the sodium carbonate overbased sodium sulfonate and the diluent oil are heated to 75° C. Boric acid is then added slowly without substantially changing the temperature of the mixture.

The reaction mixture is then slowly heated to 100° C., over a period of about 1 hour while removing substantially all of the distillate. The carbon dioxide is observed to be removed without substantial foaming. The product is then further heated to 150° C. for about 3 hours while removing all of the distillate. It is observed that at the latter temperature, substantially all of the water is removed and very little of the carbon dioxide is evolved from the product. The product is then held for another hour at 150° C. until the water content of the product is less than about 0.3%.

The product is recovered by allowing it to cool to 100° C.–120° C. followed by filtration. The recovered filtrate of high clarity is the product.

Organic Binder

Binders may be included in the compositions to facilitate the production of sintered shapes whether the shapes are produced by extrusion or injection molding, press molding or slip casting or other methods.

The amount of binder included in the compositions of the present invention is an amount which provides the desired properties for the green and sintered shapes. Generally, the compositions will contain from about 5% by weight of the binder based on the weight of the inorganic powder although larger amounts, such as to about 30% by weight, can be utilized in some applications. The binder may be present in amounts greater than about 0.5% by weight based on the inorganic powder.

A variety of binders have been suggested and utilized in the prior art and can be utilized in the methods and compositions of the present invention. Examples these binders include starch, cellulose derivatives, polyvinyl alcohols, polyvinylbutyral, etc. Examples of synthetic resin binders include thermoplastic materials such as polystyrene, polyethylene, polypropylene and mixtures thereof.

Other binders which are useful in the composition of the invention include vegetable oils, petroleum jelly and various wax-type binders which may be hydrocarbon waxes or oxygen-containing hydrocarbon waxes. Examples of hydrocarbon waxes include petroleum waxes such as paraffin wax, microcrystalline wax, petrolatum, etc., synthetic hydrocarbons such as Fischer-Tropsch wax, low molecular weight polyethylene, etc. Examples of oxygen- containing waxes include higher fatty acids and esters and glycerides of the higher fatty acids with a higher alcohol, and oxygen-containing compounds obtained by air-oxidation of normal paraffin or isoparaffin such as alcohols, ketones, carboxylic acids, oxycarboxylic acids, keto carboxylic acids, esters, lactones, etc. The oxygen-containing wax-type binders may be natural waxes and/or synthetic waxes. The natural waxes include animal waxes such as bees wax, whale wax, China wax, wool wax; vegetable waxes such as candelilla wax, carnuba wax, Japan wax, sugarcane wax, etc.; and mineral waxes such as montan wax, ozokerite wax, lignite wax, etc. Examples of synthetic oxygen-containing wax-type binders include modified waxes such as montan wax derivatives, paraffin wax derivatives, microcrystalline wax derivatives, etc.; higher monohydric alcohols such as cetyl alcohol, stearyl alcohol, myristyl alcohol, lauryl alcohol, etc.; higher fatty acids such as capric acid, laurie acid, palmitic acid, stearic acid, etc. Mixtures of any of the above waxes also can be utilized as binders in the present invention.

Sinterina Aids

"Sintering aids" may be organic or inorganic materials which improve the properties of the final sintered products. Examples of these materials include the hydroxides, oxides or carbonates of alkali metals, alkaline earth metals, and the transition metals including, in particular, the rare earth elements. Specific examples of inorganic sintering aids include calcium oxide, magnesium oxide, calcium carbonate, magnesium carbonate, zinc oxide, zinc carbonate, yttrium oxide, yttrium carbonate, zirconium oxide, zirconium carbonate, lanthanum oxide, neodymium oxide, samarium oxide, etc. In another embodiment,above-described overbased and gelled overbased metal salts may be used as sintering aids. Small amounts of the sintering aids generally are sufficient to provide the desired improvement in strength, thermal conductivity and/or density of the sintered shapes, thus, amounts of from about 0.05%, preferably about 0.1% to about 10%, preferably to about 5%, by weight of the sintering aid, based on the weight of the inorganic powder, are sufficient.

Liquid Dispersing Medium

The compositions of the present invention also may contain, and generally do contain a liquid dispersing medium. It is an important aspect of this invention, however, that mixtures, dispersions and/or slurries prepared with the compositions of the present invention are homogeneous, substantially free of agglomerated inorganic powder particles, and stable. It also is preferred that the liquid dispersing medium be volatile under the conditions of drying or binder burnout prior to the early stages of sintering so that the medium does not interfere with the preparation of compacted inorganic shapes characterized by desirable densities and the absence of cracks and other defects. The medium can have components characterized by relatively low boiling points such as, for example, in the range of about 25° C. to about 120° C. to facilitate subsequent removal of a portion or substantially all of the medium from the compositions of the invention. Alternatively, the medium may contain components that have higher boiling points to protect against removal from such compositions upon standing or initial heating. There is no criticality in an upper boiling point limitation on these liquids except, as noted above, the liquids should be removable prior to the initial sintering process.

The liquid dispersing medium may be oxygenated or hydrocarbon in nature. Oxygenated solvents include alcohols, esters, ketones and water as well as ethoxylated versions of the same. Combinations of these materials are also useful. Alcohols include alcohols having less than 12 carbon atoms, especially lower alkanols, such as methanol, ethanol, propanol and butanol. Esters include carboxylic esters prepared from carboxylic acids having from 2 to 20 carbon atoms and alcohols having from 1 to about 22 carbon atoms. Examples of carboxylic esters include methylacetate, ethylacetate, propylacetate. Ketones include methylethyl ketone, methylisobutyl ketone as well as keto alcohols such as diacetone alcohol, hydroxy acetone, hydroxymethylpentanone and the like. Tetrahydrofuran may also be used as a liquid dispersing medium.

The oxygenated dispersing media include alkoxy alcohols which are characterized as having ether linkages and may be prepared by using alkylene oxides having from 2 to about 10 carbons atoms, such as ethylene oxide, propylene oxide and the like. Alkoxy alcohols are available commercially under trade names such as Cellosolve™, Propasol™, Carbitol® solvents available from Union Carbide. Examples of these materials include ethylene glycol monoethyl, monopropyl, monobutyl or monohexyl ethers, propylene glycol monomethyl, monoethyl, monopropyl, monobutyl and monohexyl ethers and the like. Alkoxy alcohols also include polyoxyalkylene glycols such as Carbowax® PEG 300, 600, 1000 and 1450 available from Union Carbide Corporation. Polyoxypropylene glycols are also useful, such as Nyax 425 and Nyax 1025 available from Union Carbide and PPG-1200 and PPG-2000 available from Dow Chemical. Polyoxyalkylene polyols such as "TRITON®" available from Rohm & Haas Company, "CARBOWAX®" and "TERGITOL®" available from Union Carbide, "ALFONIC®" available from Conoco Chemical Company and "NEODOL®" available from Shell Chemical are useful as liquid dispersing media.

Alkyl, cycloalkyl and aryl hydrocarbons, as well as petroleum fractions may also be used as liquid media in this invention. Included within these types are benzene and alkylated benzenes, cycloalkanes and alkylated cycloalkanes, cycloalkenes and alkylated cycloalkenes such as found in the naphthene-based petroleum fraction, and the alkanes such as found in the paraffin-based petroleum fractions. Petroleum ether, naphthas, mineral oils, Stoddard Solvent, toluene, xylene, etc., and mixtures thereof are examples of economical sources of suitable liquid disperse medium.

The amount of liquid disperse medium utilized in the compositions of the present invention may vary over a wide range although it is generally desirable to prepare compositions containing a maximum amount of the inorganic powder and a minimum amount of the disperse medium. The amount of liquid disperse medium utilized in any particular combination can be readily determined by one skilled in the art will depend upon the nature of the inorganic powder, the type and amount of dispersant, and any other components present in the composition. The amount of liquid dispersed medium present is usually from as low as 1–2%, generally about 5%, preferably about 10%, more preferably about 15%, to about 40%, preferably about 35%, more preferably about 30% by weight based on the amount of inorganic powder (A).

Other Additives

Other materials may be added to the compositions of the present invention. For example, plasticizers may be added to the compositions to provide more workable compositions. Examples of plasticizers normally utilized in inorganic formulations include dioctyl phthalate, dibutyl phthalate, benzyl butyl phthalate and phosphate esters.

Preparation

The preparation of inorganic shapes utilizing the methods of the present invention generally involves mixing the inorganic powder with the additives (B). The mixture can be prepared either in the absence or presence of a volatile liquid dispersing medium. Any of the abovedescribed components described above can be mixed with the inorganic powder and the polymer at this stage. The mixed composition then is blended in, for example, a ball-mill where additional components can be added and blended into the mixture as desired. The blended mixture can then be shaped in a mold, a still water press, or sheet mold. Alternatively, the blended mixture can be extrusion- or ejection-molded to form a shape, or the mixture can be prepared by casting the mixture on a tape. The green body may also be prepared by spray-drying rotary evaporation, etc. Following the formation of the mixture into the desired shape, the shaped mass is subjected to elevated temperature treatment (sintering).

The heat treatment is a high-temperature treatment at which time the inorganic powders are sintered, resulting in the formation of a shape having the desired properties including suitable densities. For powder metallurgy, the sintering generally occurs between about 260° C. to about 2100° C., typically to 1000° C. For ceramic processes, the sintering generally occurs from about 600° C., preferably about 700° C. up to about 1700° C. When the inorganic powders (A) are oxide powders, baking and sintering can be effected in the presence of air or oxygen. However, when the inorganic powders are non-oxide powders such as the nitrides and carbides, sintering is effected in a nonoxidizing atmosphere such as an atmosphere of hydrogen, argon or nitrogen gas.

In one embodiment, the shaped mass is heated to a temperature which is sufficient to remove organic materials from the green body. That is, the body is heated to a temperature which is sufficient to vaporize and/or decompose organic materials from the body. This heating step, often referred to as drying or binder burn-out, takes place at moderately elevated temperatures, and is generally completed at a temperature below about 700° C.

Removal of organic materials is generally carried out under conditions which provide for the removal of the organic materials before the inorganic powders are subjected to sintering.

In another embodiment, the organic materials, including binder, may be removed by solvent extraction. The solvent extraction may also be super critical solvent extraction, i.e., at high temperature and pressure. Generally, the green body is heated to above the flow point of the binder and exposed to solvent vapor. The green body may also be submerged in a solvent bath. In one embodiment, the green body is exposed to solvent extraction and then undergoes drying (burn out) to remove the organic materials. The solvents useful for extraction include liquid dispersing media described above. Alcohols, alkanes, such as hexane, pentane, octane, etc., and aromatic fractions including toluene and xylene are particularly useful.

U.S. Pat. Nos. 4,961,913 and 4,197,118 describe solvent extraction processes for ceramics and are hereby incorporated by reference for that disclosure.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for preparing sintered shapes, comprising the steps of:

(1) forming a green body from a mixture comprising a major amount of at least one inorganic powder; and one or more additives selected from the group consisting of: (A) at least one reaction product of a hydroxy compound with a carboxylic acylating agent; (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) a substituted carboxylic acylating agent formed by the reaction of a carboxylic acylating agent and a polymeric material; (H) at least one aromatic acid or derivative thereof; (I) at least one aromatic oxime; and (J) at least one overbased or gelled overbased metal salt of an acidic organic compound provided that when the carboxylic acylating agent is a hydrocarbyl-substituted carboxylic acylating agent and the hydrocarbyl group contains less than an average of 40 carbon atoms, then the carboxylic acylating agent is a polycarboxylic acylating agent; and 2. sintering the body.

2. The method of claim 1, wherein the additive is the reaction product (A) and the acylating agent is a succinic acylating agent.

3. The method of claim 1, wherein the additive is the reaction product (A) and the carboxylic acylating agent is a hydrocarbyl-substituted succinic acylating agent wherein the hydrocarbyl group is derived from a polyalkene having a number average molecular weight from about 600 to about 5000.

4. The method of claim 1, wherein the additive is the reaction product (A) and the carboxylic acylating agent is a carboxylic acylating agent prepared by polymerizing an alkenyl aromatic monomer or olefin with an alphabeta unsaturated carboxylic acid or derivative thereof.

5. The method of claim 4, wherein the carboxylic acylating agent is a copolymer of styrene and maleic anhydride.

6. The method of claim 1, wherein the additive is the reaction product (A) and the carboxylic acylating agent is a carboxylic acylating agent prepared by polymerizing an olefin having from 2 to about 30 carbon atoms with maleic anhydride.

7. The method of claim 1, wherein the additive is the reaction product (A) and the carboxylic acylating agent is a carboxylic acylating agent prepared by grafting an unsaturated carboxylic acid or derivative onto a hydrocarbon polymer.

8. The method of claim 7, wherein the hydrocarbon polymer is a hydrogenated styrene-isoprene or a hydrogenated styrene-butadiene polymer.

9. The method of claim 1, wherein the additive is the reaction product (A) and the hydroxy compound is an alcohol having from 2 to about 40 carbon atoms and from 1 to about 10 hydroxyl groups.

10. The method of claim 1, wherein the additive is the reaction product (A) and the hydroxy compound is a pentaerythritol, a glycerol, a propylene glycol or an ethylene glycol.

11. The method of claim 1, wherein the additive is a Mannich reaction product (B) prepared by reacting at least one hydrocarbyl-substituted hydroxyaromatic compound with at least one aldehyde and at least one amine.

12. The method of claim 1, wherein the additive is a hydrocarbyl-substituted amine (C) prepared by reacting a polyalkene or chlorinated polyalkene with an amine.

13. The method of claim 1, wherein the additive is an aminophenol (D) or the reaction product (E) of a nitrophenol and an amino compound.

14. The method of claim 13, wherein the carboxylic acylating agent is a hydrocarbyl-substituted carboxylic acylating agent having a hydrocarbyl group derived from a polyalkene having a number average molecular weight from about 600 to about 5000.

15. The method of claim 14, wherein the carboxylic acylating agent prepared by polymerizing an alkenyl aromatic monomer or olefin with an alpha-beta unsaturated carboxylic acid or derivative thereof.

16. The method of claim 14, wherein the carboxylic acylating agent is a copolymer of styrene and maleic anhydride.

17. The method of claim 14, wherein the acylating agent is a interpolymer of an olefin having from 2 to about 30 carbon atoms and maleic anhydride.

18. The method of claim 14, wherein the carboxylic acylating agent is prepared by grafting an unsaturated carboxylic acid or derivative thereof onto a hydrocarbon polymer.

19. The method of claim 18, wherein the hydrocarbon polymer is a hydrogenated styrene-isoprene or a hydrogenated styrene-butadiene polymer.

20. The method of claim 1, wherein the additive is an aromatic acid or derivative thereof (H).

21. The method of claim 20, wherein the aromatic acid or derivative thereof (H) is a salicylic acid or derivative thereof.

22. The method of claim 1, wherein the additive is an aromatic oxime (I).

23. The method of claim 1, wherein the additive is (J) an overbased metal salt or at least one gelled overbased metal salt of a sulfonic acid, carboxylic acid, phosphorus acid, phenol or mixtures thereof.

24. The method of claim 23, wherein the overbased metal salt or gelled overbased metal salt is a boron-containing overbased metal salt or boron-containing gelled overbased metal salt.

25. The method of claim 1, wherein the additive is present in an amount from about 0.05% to about 30% by weight based on the inorganic powder.

26. The method of claim 1, wherein the mixture of step (1) includes water.

27. The method of claim 1, wherein step (2) further comprises removing volatile material from the shape.

28. A method for preparing sintered shapes, comprising the steps of:

(1) forming a green body from a mixture comprising a major amount of at least one inorganic powder; and from 0.5 to 30% by weight based on the inorganic powder of one or more additives selected from the group consisting of: (A) at least one reaction product of a hydroxy compound with a polycarboyxlic acylating agent, (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) at least one polycarboxylic acylating agent; (H) at least one aromatic acid or derivative thereof; (I) at least one aromatic oxime; and (J) at least one overbased or gelled overbased metal salt of an acidic organic compound; and (2) sintering the body.

29. An article, comprising:

a green body comprising a major amount of at least one inorganic powder; and one or more additives selected from the group consisting of (A) at least one reaction product of a hydroxy compound with a carboxylic acylating agent; (B) at least one Mannich reaction product; (C) at least one hydrocarbyl-substituted amine; (D) at least one aminophenol; (E) at least one reaction product of a nitrophenol and amino compound; (F) at least one basic nitrogen-containing polymer; (G) at least one carboxylic acylating agent; (H) at least one aromatic acid or derivative thereof; (I) at least one aromatic oxime; and (J) at least one overbased or gelled overbased metal salt of an acidic organic compound provided that when the carboxylic acylating agent is a hydrocarbyl-substituted carboxylic acylating agent and the hydrocarbyl group contains less than an average of 40 carbon atoms, then the carboxylic acylating agent is a polycarboxylic acylating agent.

30. A sintered shape prepared by the method of claim 1.

* * * * *